United States Patent
Moghaddam et al.

(10) Patent No.: US 11,953,080 B1
(45) Date of Patent: Apr. 9, 2024

(54) SHAFT WITH SURFACE FINISHED RIDGES

(71) Applicants: Sina Mobasher Moghaddam, Campbell, CA (US); Troy A. Carter, Sunnyvale, CA (US); Jonathan L. Hall, Menlo Park, CA (US)

(72) Inventors: Sina Mobasher Moghaddam, Campbell, CA (US); Troy A. Carter, Sunnyvale, CA (US); Jonathan L. Hall, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/879,160

(22) Filed: Aug. 2, 2022

Related U.S. Application Data

(60) Provisional application No. 63/247,816, filed on Sep. 24, 2021.

(51) Int. Cl.
| | |
|---|---|
| *F16H 25/24* | (2006.01) |
| *F16H 25/22* | (2006.01) |
| *B60G 17/00* | (2006.01) |
| *F16H 25/20* | (2006.01) |

(52) U.S. Cl.
CPC ......... *F16H 25/2214* (2013.01); *B60G 17/00* (2013.01); *B60G 2202/44* (2013.01); *B60G 2204/62* (2013.01); *B60G 2206/80* (2013.01); *B60G 2500/00* (2013.01); *B60G 2800/162* (2013.01); *F16H 2025/204* (2013.01)

(58) Field of Classification Search
CPC ........... F16H 2025/204; F16H 25/2214; F16H 25/228; F16H 25/20; B60G 2206/80; B60G 2202/44; B60G 2202/422
See application file for complete search history.

(56) References Cited

U.S. PATENT DOCUMENTS

| | | | | |
|---|---|---|---|---|
| 3,046,808 A | * | 7/1962 | De Mart | F16H 25/2214 74/424.7 |
| 4,939,946 A | * | 7/1990 | Teramachi | F16D 3/065 74/89.3 |
| 5,121,647 A | * | 6/1992 | Teramachi | F16H 25/2018 74/89.3 |

(Continued)

FOREIGN PATENT DOCUMENTS

| | | |
|---|---|---|
| EP | 2202427 A1 | 6/2010 |
| JP | 5428807 B2 | 2/2014 |
| JP | 5487924 B2 | 5/2014 |

OTHER PUBLICATIONS

"Are you using the right finishing system?" (May 1, 2018), Finishing Systems (Year: 2018).*

*Primary Examiner* — Gregory Robert Weber
(74) *Attorney, Agent, or Firm* — Young Basile Hanlon & MacFarlane, P.C.

(57) ABSTRACT

A ball screw spline actuator includes a shaft, a ball nut, and a ball spline. The shaft includes a helical groove and a spline groove intersecting the helical groove forming intersections having a least one ridge including a first surface finish formed by a first manufacturing operation. The ridge is subsequently reformed through a second manufacturing operation to include a second surface finish to reduce stress concentrations in the ridge from cyclical loading from at least one of the ball nut or the ball spline. In one example, the second manufacturing operation reforms the ridge to include a surface finished edge.

20 Claims, 8 Drawing Sheets

(56) References Cited

U.S. PATENT DOCUMENTS

| | | | | |
|---|---|---|---|---|
| 5,228,353 A | * | 7/1993 | Katahira | F16H 25/2204 |
| | | | | 74/89.3 |
| 5,231,888 A | * | 8/1993 | Katahira | F16H 25/2018 |
| | | | | 74/89.3 |
| 5,327,795 A | * | 7/1994 | Katahira | G05B 19/19 |
| | | | | 74/89.3 |
| 5,647,131 A | * | 7/1997 | Hirsch | B23B 51/101 |
| | | | | 30/169 |
| 5,649,451 A | * | 7/1997 | Ruland | B23Q 5/326 |
| | | | | 74/89.3 |
| 6,125,731 A | * | 10/2000 | Seto | F16H 25/24 |
| | | | | 83/552 |
| 8,141,448 B2 | * | 3/2012 | Watanabe | F16C 29/0688 |
| | | | | 74/424.81 |
| 8,668,060 B2 | * | 3/2014 | Kondo | B60G 13/02 |
| | | | | 188/267 |
| 9,908,183 B2 | * | 3/2018 | Faessler | B23D 79/023 |
| 10,914,365 B2 | | 2/2021 | Amemiya | |
| 11,458,549 B2 | * | 10/2022 | Su | B23B 51/101 |
| 2010/0206114 A1 | * | 8/2010 | Koyagi | F16C 29/0685 |
| | | | | 74/424.82 |
| 2013/0228031 A1 | * | 9/2013 | Gerat | B25J 9/044 |
| | | | | 901/41 |
| 2017/0282258 A1 | * | 10/2017 | Ohno | F16K 11/0873 |
| 2021/0364070 A1 | * | 11/2021 | Keranen | F16H 25/24 |

\* cited by examiner

SHAFT WITH SURFACE FINISHED RIDGES

CROSS-REFERENCE TO RELATED APPLICATION(S)

This application claims the benefit of U.S. Provisional Application No. 63/247,816, filed Sep. 24, 2021, the contents of which are hereby incorporated by reference herein for all purposes.

TECHNICAL FIELD

This application generally relates to ball screw spline actuators.

BACKGROUND

Ball screw spline actuators serve to provide flexibility to impart linear translation, rotation, or linear translation and rotation of a shaft engaged with a ball nut and a ball spline.

Actuators may serve to absorb forces received from surfaces through an unsprung mass. Active actuators may further serve to apply forces between the unsprung mass and a sprung mass to actively reduce vibrations. The actuators may experience a high number of cyclical movements and the internal components are subject to relatively high cyclical loads in operation.

SUMMARY

Disclosed is a ball screw spline actuator. In one example, the ball screw spline actuator includes a ball nut, a ball spline, and a shaft having a longitudinal axis. The shaft includes a helical groove engaged by the ball nut and a spline groove engaged by the ball spline allowing linear translational movement of the shaft and preventing rotation. The shaft helical groove and spline groove intersect at a plurality of intersections that each define at least one ridge. In one example, the helical groove and the spline groove have a first surface finish and the at least one ridge is configured to have a second surface finish that is different from the first surface finish.

In one example, the helical groove and the spline groove include arcuate cross-sections and the at least one ridge includes curved sidewalls defining an edge formed by the convergence of the curved sidewalls. The ridge and the edge are initially formed with the first surface finish. The edge is subsequently reformed to include the second surface finish defining a surface finished edge that is configured to reduce a stress concentration in the ridge as a result of a cyclical load applied by at least one of the ball nut or the ball spline.

In another example, the helical groove and the spline groove intersect at a plurality of intersections forming four ridges each having a surface finished edge formed at a first time. The surface finished edge is configured to reduce a stress concentration in the ridge when placed under a cyclical load applied by at least one of the ball nut or the ball spline. In one example, each ridge includes curved sidewalls converging at an edge that are formed at a first time. The surface finished edge is formed at the edge at a second time subsequent to the first time.

In one example, the surface finished edge includes a radius formed at the second time. In another example, the surface finished edge includes a tumbled edge formed at the second time.

In one example, the ball screw spline actuator is configured as a suspension actuator having a housing connected to a vehicle body of a vehicle. The ball nut is rotatably connected to the housing and the ball spline is connected to the housing. The suspension actuator is configured to form a load path between a vehicle body of a vehicle and an unsprung mass component of the vehicle. The shaft linearly translates along the longitudinal axis relative to the vehicle body allowing relative movement between the vehicle body and the unsprung mass component of the vehicle.

Also disclosed is a method for manufacturing a ball screw spline actuator. In one example, a shaft is provided including a longitudinal axis. A helical groove and a spline groove are formed in the shaft by a first manufacturing operation. The spline groove intersects the helical groove at a plurality of intersections each forming at least one ridge having an edge in the first manufacturing operation. In one example, each ridge is reformed in a second manufacturing operation to include a surface finished edge configured to reduce a stress concentration in the at least one ridge when the ridge is placed under a cyclical load.

In one example of the method, a ball nut is engaged with the helical groove and a ball spline is engaged with the spline groove. In one example, the ball screw spline actuator is configured as a suspension actuator for a vehicle operable to linearly translate the shaft relative to a sprung mass component of the vehicle without rotation of the shaft.

DETAILED DESCRIPTION

Actuators are used in applications to impart relative motion between two components. Ball screw spline actuators may be used to impart either relative linear translation, rotation, or linear translation and rotation of a shaft relative to another component.

Suspension actuators used in vehicles form a load path between an unsprung mass, for example the vehicle wheel assemblies, and a sprung mass, for example the vehicle body. In one example of a suspension actuator, the load path includes a first load path provided by an air spring or a coil spring that absorbs some loads or vibrations and serves to set the riding height of the vehicle. The load path includes a second load path provided by a ball screw spline actuator that serves to absorb high-frequency vibrations or loads received by the suspension actuator from, for example, the road surface while the vehicle is in motion.

One example of a ball screw spline actuator configured as a suspension actuator for a vehicle includes an electric motor used to rotate a ball nut (or ball screw nut), which causes linear motion of a shaft that is engaged with the ball nut. Linear motion of the shaft occurs because the ball nut is restrained from linear motion and the shaft is restrained from rotating. As an example, a ball spline (or ball spline nut) can engage one or more linear grooves that are formed in the shaft that applies a reaction torque that restrains rotation of the shaft. This restraint from rotation causes linear translation of the shaft relative to the ball nut, the ball spline, and the vehicle body. The linear translation of the shaft relative to the vehicle body serves to absorb or dampen vibrations or energy between the vehicle wheels and the vehicle body resulting in less movement felt by occupants of the vehicle.

Due to the high mass of the vehicle and imperfections in the surface of roadways, the suspension actuators undergo high duty cycles imparting significant cyclical loads (i.e., forces) on the internal components of the ball screw spline actuator. Over the life cycle of the suspension actuator, the frequent and large cyclical loads on the suspension actuator can cause wear and damage to even hardened metal components reducing the optimal performance of the internal components and overall performance and effectiveness of the suspension actuator.

Figure 1:
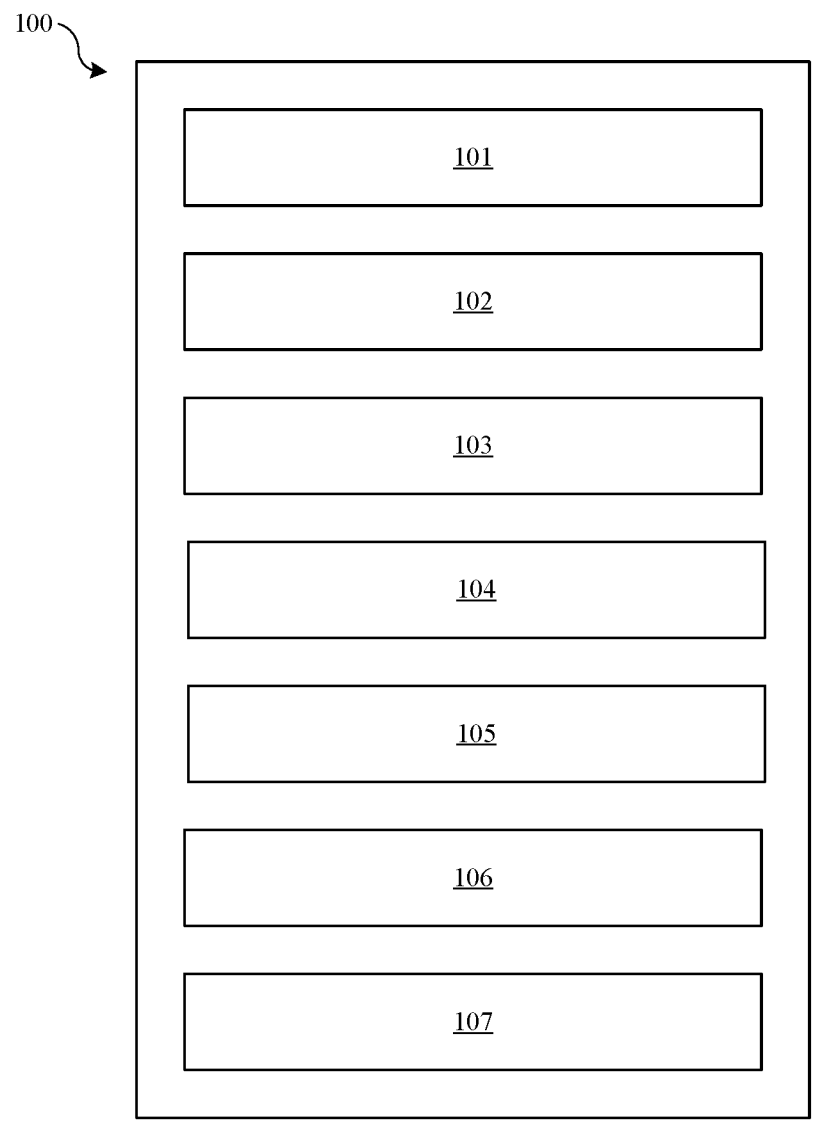
FIG. 1 is a schematic block diagram of a vehicle and example vehicle systems.

FIG. 1 is a block diagram that shows a vehicle 100 and example vehicle systems. As an example, the vehicle 100 may be a conventional road-going vehicle that is supported by wheels and tires (e.g., four wheels and tires). As an example, the vehicle 100 may be a passenger vehicle. As another example, the vehicle 100 may be a vehicle used to primarily carry and transport cargo. As another example, the vehicle may be a two-wheeled or three-wheeled vehicle.

In the illustrated example, the vehicle 100 includes several systems including a vehicle body 101, a suspension system 102 including suspension actuators (discussed further below) and wheels, a propulsion system 103, a braking system 104, a steering system 105, a sensing system 106, and a control system 107. Additional or alternate systems may be included in the vehicle 100.

The vehicle body 101 is a structural component of the vehicle 100 through which other components are interconnected and supported. The vehicle body 101 may, for example, include or define a passenger compartment for carrying passengers. The vehicle body 101 may include structural components (e.g., a frame, subframe, unibody, monocoque, etc.) and aesthetic components (e.g., exterior door and body panels).

The suspension system 102 supports a sprung mass of the vehicle 100, for example the vehicle body 101, with respect to an unsprung mass of the vehicle 100, for example the wheels. In one example, the suspension system 102 is an active suspension system that is configured to control generally vertical motion of the wheels. Broadly speaking, the suspension system 102 controls vertical motion of the wheels of the vehicle 100 relative to the vehicle body 101, for example, to ensure contact between the wheels (e.g., tires) and a surface of the roadway and to reduce or absorb undesirable movements of the vehicle body 101.

The suspension system 102 may be active through user settings and/or sensing system 106. In one example, the suspension system 102, in part through the ball screw spline actuators described below, is able to be set to certain conditions or preferences by a user. In one example, a user may select a suspension sport or performance mode where the vehicle ride handling is firmer and more responsive, or a comfort mode where the ride handling of the suspension system 102 absorbs more vibrations from the unsprung mass for a smoother ride by occupants positioned in the vehicle body 101. In alternate or additive features of an active suspension system, the suspension system 102 through suspension actuators 212 may be predictive and/or reactive to vehicle body conditions or roadway conditions detected by the sensing system 106.

The suspension system 102 includes suspension actuators 212 that are configured to transfer energy into and absorb energy from the wheels, such as by applying upward and downward forces to introduce energy into and absorb energy from the wheels. The components of the suspension system 102 may be operated in accordance with signals from sensors in the sensing system 106 and under control from the control system 107, for example, in the form of commands transmitted from the control system 107 to the suspension system 102 and suspension actuators 212.

The propulsion system 103 includes propulsion components that are configured to cause motion of the vehicle 100 (e.g., accelerating the vehicle 100). The propulsion system 103 may include motors and associated propulsion components such that are operable to generate torque and deliver that torque to the wheel that are in contact with the roadway. Motors included in the propulsion system 103 may be, as examples, an internal combustion engine powered by a combustible fuel, or one or more electric motors that are powered by electricity (e.g., from a battery).

The braking system 104 provides deceleration torque for decelerating the vehicle 100. The braking system 104 may include friction braking components such as disk brakes or drum brakes. The braking system 104 may use an electric motor of the propulsion system 103 to decelerate the vehicle by electromagnetic resistance, which may be part of battery charging in a regenerative braking configuration.

The steering system 105 is operable to cause the vehicle to turn by changing a steering angle of one or more of the wheels of the vehicle 100.

The sensing system 106 includes sensors for observing external conditions of the environment around the vehicle 100 (e.g., location of the roadway and other objects) and conditions of the vehicle 100 (e.g., acceleration and conditions of the various systems and their components). The sensing system 106 may include sensors for detecting conditions inside the vehicle, for example the position or distribution of the occupants of the vehicle body. The sensing system 106 may include sensors of various types for various vehicle functions. For example, the suspension system 102 and the suspension actuators may include sensors, or portions of the suspension actuators may function as sensors by measuring current draw of an electric motor in the actuator. Other sensors, and sensors for other functions, may be used.

The control system 107 includes communication components (i.e., for receiving sensor signals and sending control signals) and processing components (i.e., for processing the sensor signals and determining control operations), such as a controller. The control system 107 may be a single system or multiple related systems. For example, the control system 107 may be a distributed system including components that are included in other systems of the vehicle 100, such as the suspension system 102 including the suspension actuators, the propulsion system 103, the braking system 104, the steering system 105, the sensing system 106, and/or vehicle other systems. Other control systems, control system components, and control system functions may be used or included.

Figure 2:
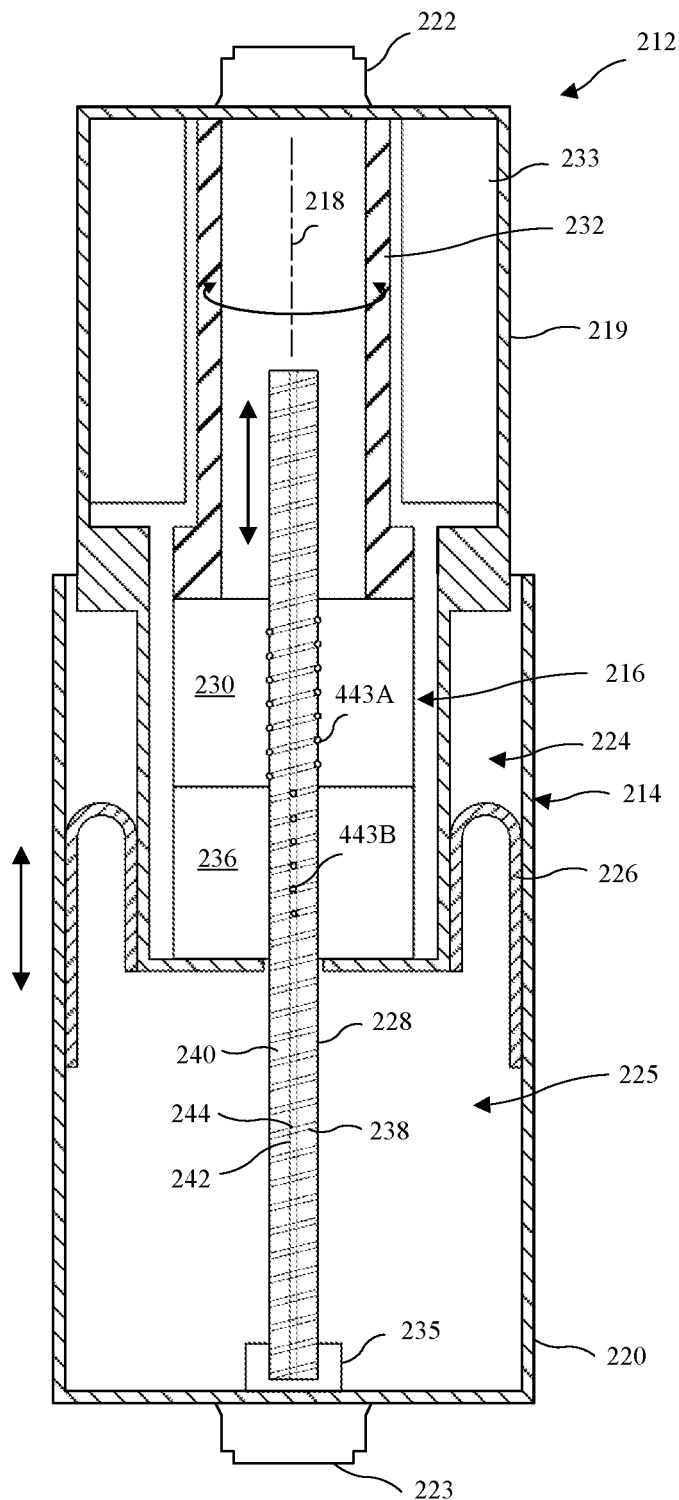
FIG. 2 is a cross-sectional view of one example of a suspension actuator including an air spring.
Figure 3:
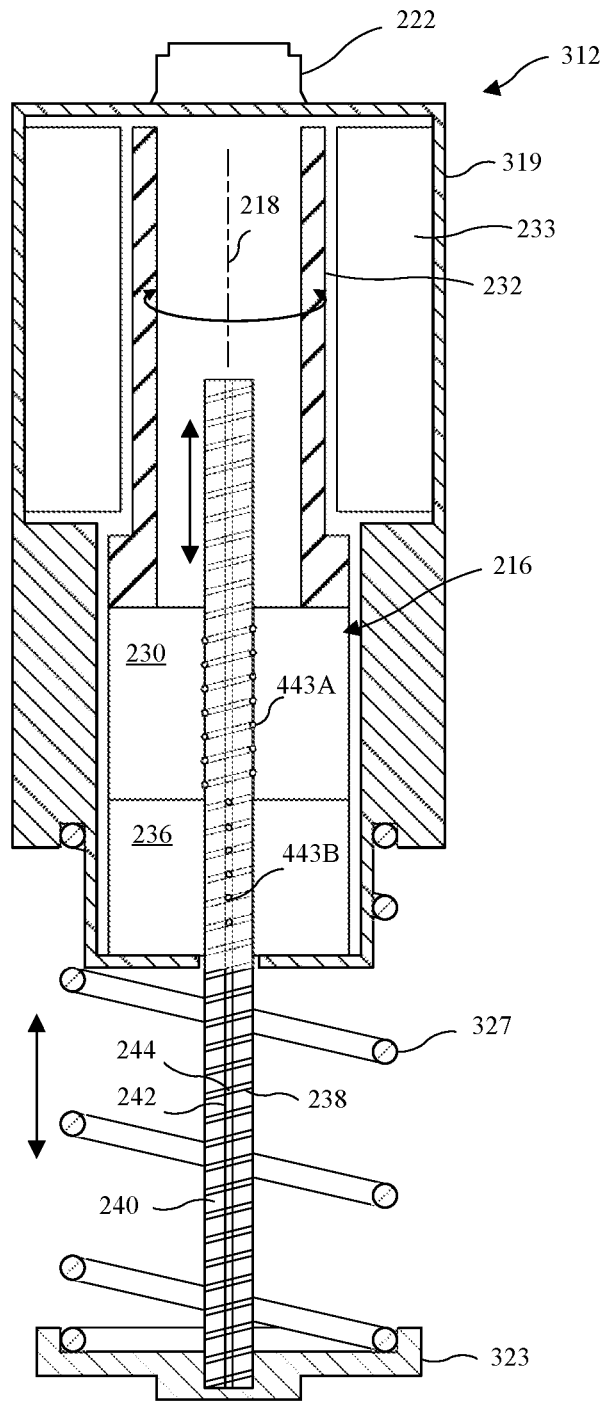
FIG. 3 is a cross-sectional view of another example of a suspension actuator including a coil spring.
Figure 4A:
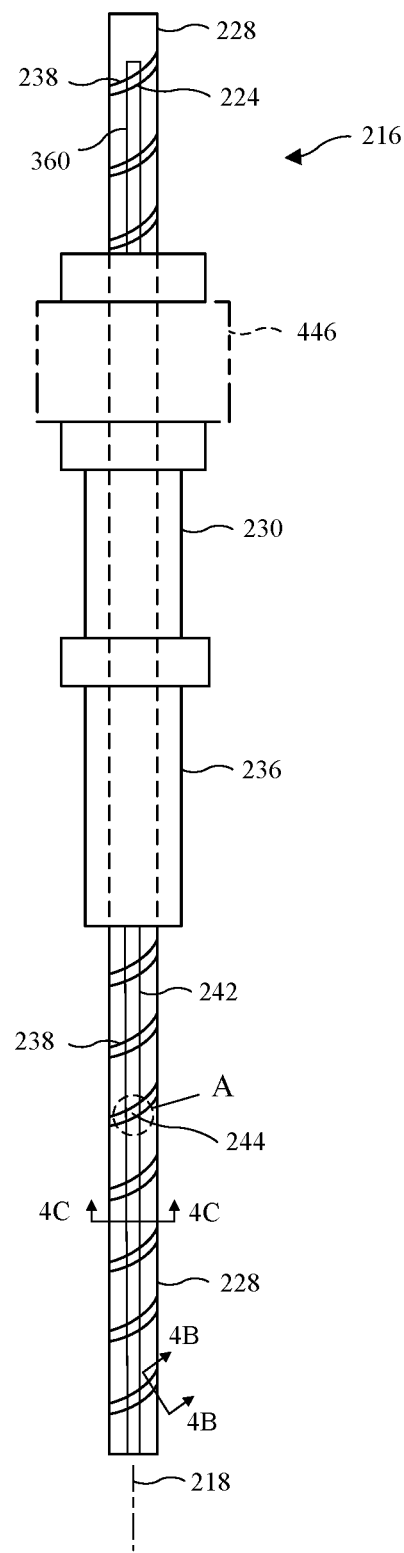
FIG. 4A is a schematic front view of an example of a ball screw spline actuator.

Referring generally to the FIGS. 2, 3, and 4A examples, a ball screw spline actuator 216 is shown in one application configured as a suspension actuator 212 of a vehicle 100 (FIGS. 2 and 3). The suspension system 102 includes the suspension actuator 212 that controls the motion (e.g., translation in the generally vertical direction) of the wheels. In the example of the ball screw spline actuator 216 configured as a suspension actuator 212, each suspension actuator 212 is an active suspension component that is operable to actively apply forces to a wheels (or components connected to the wheels) as previously described. The suspension actuator 212 may be connected so that it is able to apply forces between the wheel and the vehicle body 101, whether connected directly or indirectly to the wheel assembly and/or the vehicle body 101. In one example, an upper end of the suspension actuator 212 is connected to the vehicle body 101 and a lower end of the suspension actuator 212 is connected to a control arm of the suspension system 102 or other components, for example a wheel hub or other component that is connected to the wheel hub, for example a steering knuckle. Other suspension system 102 and/or suspension actuator 212 configurations, components and connections may be used.

FIG. 2 is a schematic cross-section view of the suspension actuator 212, in an example configuration including an air spring 214. The air spring 214 provides a first load path for the suspension actuator 212 between the vehicle body 101 and the vehicle unsprung mass, for example including a vehicle wheel. The suspension actuator 212 also defines a second load path between the vehicle body 101 and the unsprung mass through a ball screw spline actuator 216. The first load path is configured to carry a gravity preload of the vehicle 100 (i.e., load due to gravity irrespective of any dynamic loading) along with a portion of a dynamic load between the vehicle body 101 and the unsprung mass. The second load path is configured to carry another portion of the dynamic load between the vehicle body 101 and the unsprung mass and, as compared to the first load path, provides primary damping functions of the suspension system 102.

As further described below, the suspension actuator 212 is able to axially extend (e.g., lengthen) and retract (e.g., shorten) along a longitudinal axis 218 in response to loads or vibrations received through the unsprung mass and/or as applied by the suspension actuator 212 to the unsprung mass.

In one example, suspension actuator 212 includes a housing for positioning and connecting of internal components of the suspension actuator 212. Referring to the FIG. 2 example, the suspension actuator 212 includes a first housing part 219 and a second housing part 220. The first housing part 219 and the second housing part 220 are generally cylindrical structures that extend along the longitudinal axis 218 of the suspension actuator 212. The first housing part 219 extends from the upper end of the suspension actuator 212 along the longitudinal axis 218 toward the second housing part 220. The second housing part 220 extends upward from the lower end of the suspension actuator 212 along the longitudinal axis 218 of the suspension actuator 212 toward the first housing part 219.

A top mount 222 is connected to the upper end of the first housing part 219. The top mount 222 is configured so that it is connectable (e.g., by fasteners, by a clamping structure, by a pin, by a ball joint, or by another fastening structure) to part of the sprung mass of the vehicle 100, such as the vehicle body 101, to transfer forces between the sprung mass of the vehicle 100 and the suspension actuator 212. A bottom mount 223 is connected to the lower end of the second housing part 220. The bottom mount 223 is configured so that it is connectable (e.g., by fasteners, by a clamping structure, by a pin, by a ball joint, or by another fastening structure) to part of the unsprung mass of the vehicle 100, such as a control arm or a wheel hub, to transfer forces between the unsprung mass of the vehicle 100 (e.g., including the wheels) and the suspension actuator 212.

In the FIG. 2 example including an air spring 214, the first housing part 219 and the second housing part 220 are telescopically related so that they can move longitudinally with respect to each other along the longitudinal axis 218. Thus, the first housing part 219 and the second housing part 220 define an overlapping section in the longitudinal direction, wherein the overlapping section has a variable length according to extension and retraction of the suspension actuator 212. In the overlapping region, the first housing part 219 is spaced from the second housing part 220 in a radial direction (e.g., outward relative to a radial center of the suspension actuator 212, for example the longitudinal axis 218) by a radial gap 224.

In the FIG. 2 example, an inner diameter of the second housing part 220 is larger than an outer diameter of the first housing part 219 in the overlapping region so that a portion of the first housing part 219 is located inside the second housing part 220 within the overlapping region to define the telescopic relationship of the first housing part 219 and the second housing part 220. Alternatively, the first housing part 219 and the second housing part 220 may be configured so that an inner diameter of the first housing part 219 is larger than an outer diameter of the second housing part 220 in the overlapping region so that a portion of the second housing part 220 is located inside the first housing part 219 within the overlapping region to define the telescopic relationship as generally described.

In the FIG. 2 example, the first load path is defined between the top mount 222 and the bottom mount 223 of the suspension actuator 212 by the air spring 214. The air spring 214 is defined by an internal chamber 225 that is defined inside the suspension actuator 212, including by the first housing part 219 and the second housing part 220. The volume (e.g., the amount of space enclosed within the internal chamber 225 measured, for example, in cubic centimeters or other units) of the internal chamber 225 varies in accordance with relative movement of the first housing part 219 and the second housing part 220. A working gas (e.g., air) is contained within the internal chamber 225 and increases and decreases in pressure in correspondence to relative movement of the first housing part 219 and the second housing part 220 and the accompanying change in volume of the internal chamber 225.

The internal chamber 225 is sealed to contain the working gas within the internal chamber 225, for example, by inclusion of sealing structures included in the suspension actuator 212 that are, for example, connected to the first housing part 219 and the second housing part 220. The internal chamber 225 may include connections, for example, by valves, gas lines, and/or other structures, that allow supply of part of the working gas to the internal chamber 225 and allow discharge of part of the working gas from the internal chamber 225. This allows, for example, changes in the ride height of the vehicle 100.

To contain the working gas within the internal chamber 225 while allowing relative motion of the first housing part 219 and the second housing part 220 at the radial gap 224, the air spring 214 may include an air spring membrane 226. The air spring membrane 226 is a thin sheet of flexible material having an annular, tube-like configuration (e.g., a flexible sleeve). The air spring membrane 226 is connected to the first housing part 219 and the second housing part 220 at the radial gap 224 to prevent the working gas from escaping the internal chamber 225 at the radial gap 224 while allowing relative motion of first housing part 219 and the second housing part 220. The air spring membrane 226 may also be referred to as an air spring sleeve, an air sleeve, a diaphragm, or an air sprint diaphragm.

FIG. 3 shows an alternate example of the suspension actuator 312 that replaces the air spring 214 with a coil spring 327 to provide the first load path for the suspension actuator 312. The coil spring 327 is connected and is operable to provide the first load path in a similar manner as described for air spring 214. In the FIG. 3 example, the coil spring 327 includes an internal diameter larger than the outer diameter of a portion of an alternately configured first housing part 319 to receive the coil spring 327 in a coaxial orientation. Coil spring 327 is engaged to the first housing part 319 by a connector, for example through fasteners described above. An alternate implementation of the bottom mount 323 is used to connect the suspension actuator 312 to the unsprung mass of the vehicle as generally described for FIG. 2. In the example, the bottom mount 323 also serves to engage the coil spring 327. Other components and configurations for positioning the coil spring 327 relative to the first housing part 319, and engaging the coil spring 327 to the first housing part 319 and the unsprung mass, may be used. In another example, a second housing part (not shown) may be used in coordination with the coil spring 327 (e.g., to protect or shield the coil spring 327 from environmental elements) in a telescopic manner relative to the first housing part 319. Other components, devices and configurations may be used to provide the first load path for suspension actuator 312.

Referring to the schematic FIGS. 2 and 3 suspension actuator 212, 312 examples (collectively referred to as suspension actuator 212 unless specifically noted), the ball screw spline actuator 216 in one example configured as the suspension actuator 212 is a type of linear actuator that is utilized in the suspension actuator 212 as an active suspension component that is operable to apply forces between the top mount 222 and the bottom mount 223 of the suspension actuator 212. The ball screw spline actuator 216 is an example of a screw actuator, in which rotation of a screw or nut is used to cause linear motion of the other one of the screw or the nut, which translates with respect to the rotating component because it is restrained from rotating. The ball screw spline actuator 216 may be backdrivable so that it can allow extension and retraction of the suspension actuator 212 in response to external forces with minimal contrary force or assisting force applied by the ball screw spline actuator 216. Although the description herein is made with respect to the ball screw spline actuator 216, the suspension actuator 212 could be implemented using a screw actuator of another type, such as a lead screw actuator or other form of a linear motor device. Equally, the ball screw spline actuator 216 may be used in other applications other than in the suspension actuator 212.

Referring to the FIGS. 2, 3 and 4A examples, the illustrated ball screw spline actuator 216 includes a shaft 228, a ball nut 230, and a ball spline 236. In the example of the ball screw spline actuator 216 configured as a suspension actuator 212, the suspension actuator 212 further includes a ball screw actuator 231 including a motor having a rotor 232 and a stator 233, and a thrust bearing (discussed further below). The suspension actuator 212 further includes a housing, and a shaft coupler 235 (discussed further below).

In one example, the shaft 228 is a round, hollow shaft or rod. In an alternate example, the shaft 228 is a round, solid shaft. Other shaft 228 shapes and configurations may be used. The shaft 228 includes a helical groove 238 formed radially inward toward the longitudinal axis 218 from an outer surface 240 of the shaft 228. The helical groove 238 extends along the shaft 228 in the direction of the longitudinal axis 218 over the length of the shaft 228 (as illustrated). In an alternate example, the helical groove 238 extends over only a portion of the length of the shaft 228.

The shaft 228 also includes a spline groove 242 formed radially inward toward the longitudinal axis 218 from the outer surface 240 of the shaft 228. The spline groove 242 extends along the shaft in the direction of the longitudinal axis 218 over at least a portion of the length of the shaft 228 (as illustrated in FIG. 4A). In an alternate example, the spline groove 242 extends along the entire length of the shaft 228. In an alternate example, the spline groove 242 may include one or more spline grooves 242, for example two of the spline grooves 242 configured parallel to one another in the direction of the longitudinal axis 218.

Figure 4B:
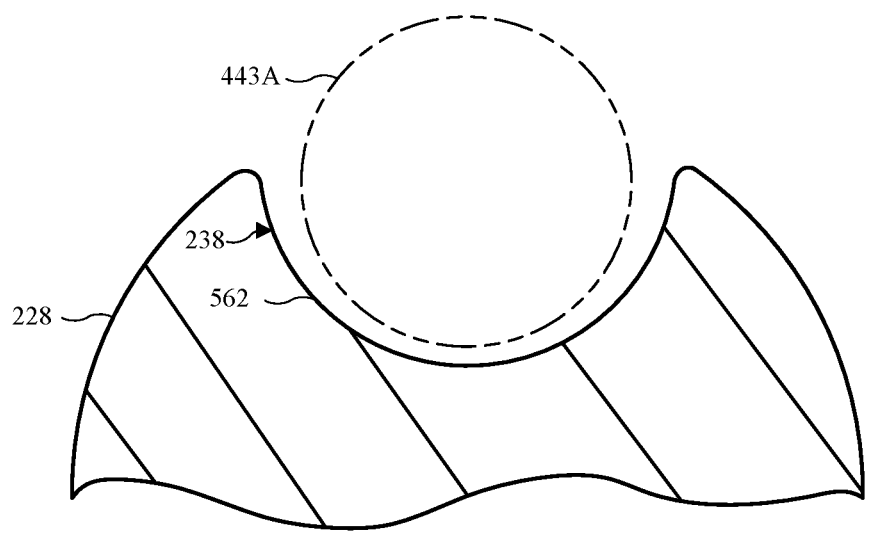
FIG. 4B is an enlarged partial cross-sectional view taken along line 4B-4B in FIG. 4A.
Figure 4C:
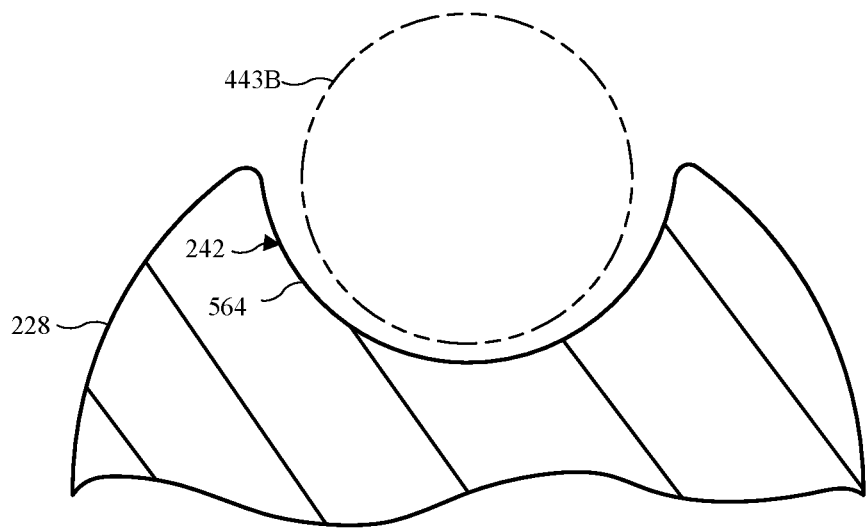
FIG. 4C is an enlarged partial cross-sectional view taken along line 4C-4C in FIG. 4A.

Referring to the FIGS. 4B and 4C examples, the helical groove 238 and the spline groove 242 are each defined by a race (discussed further below) having a profile designed to provide conformal contact with a bearing 443A, and a bearing 443B (shown in phantom line), respectively, in a direction transverse to the groove axis (i.e., in a direction transverse to the rolling direction of the bearing, discussed further below). In one example, the helical groove 238 and the spline groove 242 include an arcuate cross-section (e.g., curved). In one example as best seen in FIGS. 4B and 4C, the arcuate cross-section is a semi-circular arc or half circle (space between the bearing 443A and the helical groove 238, and the bearing 443B and the spline groove 242 shown for ease of illustration only). The spline groove 242 is configured to intersect the helical groove 238 at a plurality of intersections 244 discussed further below.

In the FIG. 2 example wherein the ball screw spline actuator 216 is configured as a suspension actuator 212, the ball screw spline actuator 216 is at least partially disposed within a housing. In the FIG. 2 example, the housing includes the first housing part 219 and the second housing part 220. In one example, the suspension actuator 212 includes a ball screw actuator 231 having a motor including the rotor 232 and the stator 233. The rotor 232 is a rotatable component in the form of a hollow, tubular structure that extends along the longitudinal axis 218 of the suspension actuator 212. The stator 233 is arranged around and radially outward from the rotor 232. Using any suitable motor-generator configuration, the rotor 232 and the stator 233 are configured such that electromagnetic interaction of the rotor 232 and the stator 233 causes rotation of the rotor 232 about the longitudinal axis 218 when the stator 233 is energized (e.g., by selective energization of stator coils that are included in the stator 233). Thus, the stator 233 is operable to rotate the rotor 232 as a result of electromagnetic interaction between the stator 233 and the rotor 232. In one example, the motor having the rotor 232 and the stator 233 are components of the suspension actuator 212 but are not part of, or components of, the ball screw spline actuator 216.

The stator 233 may be disposed in a stator housing. In addition to providing structural support for the stator 233, the stator housing absorbs heat generated by the stator 233 when it is energized. Cooling features may be included in the ball screw actuator 231, for example, adjacent to the stator housing. As one example, liquid channels may be defined around the stator housing that are defined on an outside periphery of the stator housing for circulating a liquid coolant that is able to absorb heat from the stator housing.

Referring to the FIGS. 2 and 3 examples, the ball nut 230 is rotatably connected to the first housing part 219, for example by connection to the rotor 232, allowing rotation of the ball nut 230 relative to the first housing part 219. Referring to the FIG. 4A example of the ball screw spline actuator 216, the ball nut 230 is connected to the rotor 232 and is rotated in unison with the rotor 232. The ball screw actuator 231 further includes a thrust bearing 446 (FIG. 4A) that is connected to the first housing part 219 and is engaged with the ball nut 230. The thrust bearing 446 is configured to allow the ball nut 230 to rotate about the longitudinal axis 218 and remain axially stationary along the longitudinal axis 218 relative to the first housing part 219. The ball spline 236 is connected to the first housing part 219, does not axially move along the longitudinal axis 218, and does not rotate about the longitudinal axis 218.

Referring to the example of the ball screw spline actuator 216 shown in the FIGS. 2, 3 and 4A examples, the ball nut 230 includes a plurality of the ball bearings 443A configured in a recirculating path or groove within the ball nut 230. The ball nut 230 is configured to engage the shaft 228 through positioning and engagement of the ball bearings 443A in the helical groove 238. The ball spline 236 includes a plurality of the ball bearings 443B configured in a recirculating path or groove within the ball spline 236. The ball spline 236 is configured to engage the shaft 228 through positioning and engagement of the ball bearings 443B in the spline groove 242. Although the ball spline 236 is illustrated as positioned directly adjacent to and below the ball nut 230, other configurations, positions, and orientations of the ball nut 230 and the ball spline 236 relative to each other, and relative to the shaft 228, and the first housing part 219, may be used.

In the FIGS. 2-4A examples and as described above, the ball nut 230 is prevented from axial translation along the longitudinal axis 218. As the ball nut 230 is rotated by the rotor 232 about the longitudinal axis 218, the ball nut 230 through engagement of the shaft 228 through ball bearings 443A in the helical groove 238, applies a first torque on the shaft 228 about the longitudinal axis 218. As the ball spline 236 is fixed in position axially and rotationally, the ball spline 236 through engagement of the shaft 228 through ball bearings 443B in the spline groove 242 applies a second torque to the shaft 228, counteracting the first torque applied by the ball nut 230, preventing rotation of the shaft 228 about the longitudinal axis 218 allowing shaft 228 to linearly translate along the longitudinal axis 218 relative to the ball nut 230 and the ball spline 236.

Thus, the shaft 228 is a linearly translatable shaft since it is able to translate linearly along longitudinal axis 218 relative to the ball nut 230 and the ball spline 236. In the example of the ball screw spline actuator 216 configured as a suspension actuator 212, the shaft 228 translates linearly relative to portions of the suspension actuator 212, including the first housing part 219. In the suspension actuator 212 example, the shaft 228 extends downward from the first housing part 219 to the shaft coupler 235. The shaft coupler 235 connects the shaft 228 to the second housing part 220 near the lower end of the suspension actuator 212. The shaft coupler 235 may connect the shaft 228 to the second housing part 220 so that the shaft 228 is not able to rotate or translate relative to the second housing part 220, for example, using conventional fasteners, coupling structures, welds, or other means. Thus, the shaft 228 is connected to the second housing part 220, or in the FIG. 3 example, the alternate implementation of the bottom mount 323, by a fixed connecting structure.

In one example configured as the suspension actuator 212, the ball screw spline actuator 216 is configured to rotate the ball nut 230 and linearly translate the shaft 228 downward toward the unsprung component in response to control signals received from the control system 107 based on signals received from the sensing system 106. In this example, the ball screw spline actuator 216 is configured to be backdrivable so external forces, for example upward forces from the unsprung component, for example the vehicle wheels, may linearly translate the shaft 228 upward toward the first housing part 219 without forced rotation of the ball nut 230 by the rotor 232 and the stator 233. In another example, the ball screw spline actuator 216 is configured to alternately rotate the ball nut 230 in both directions about longitudinal axis 218 to linearly translate the shaft 228 downward or upward in response to control signals from control system 107 based on signals received from the sensing system 106. Other configurations and functions of ball screw spline actuator 216 to translate the shaft 228 along longitudinal axis 218 may be used.

Figure 5:
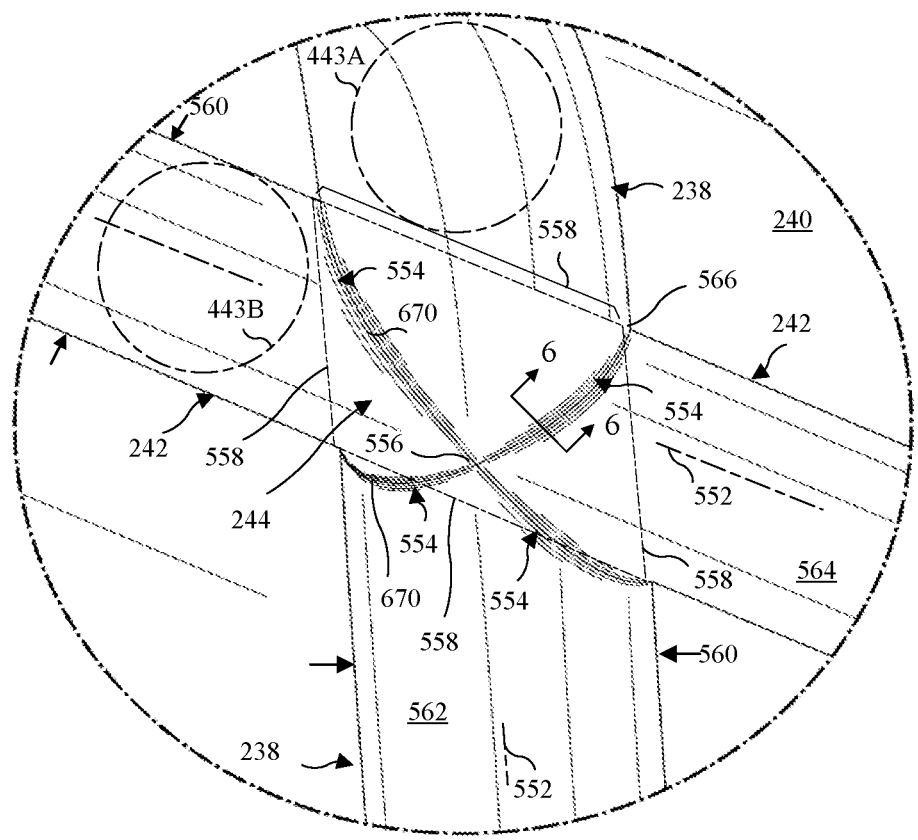
FIG. 5 is an enlarged view of the intersection area A in FIG. 4A including a first surface finish or following a first manufacturing operation.
Figure 6:
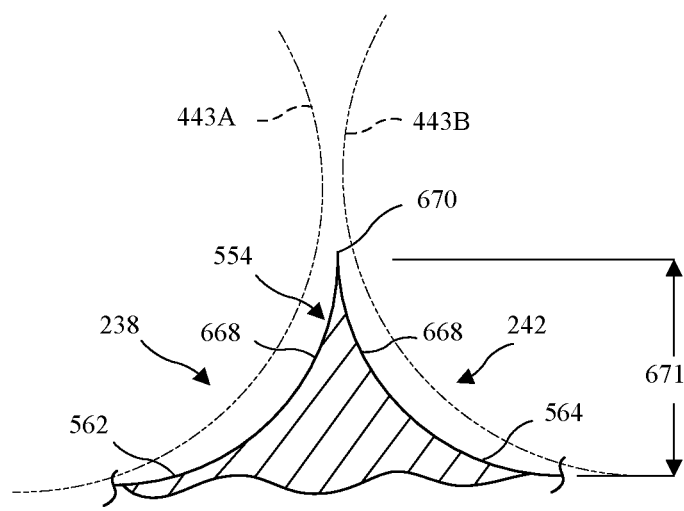
FIG. 6 is a cross-sectional view taken along line 6-6 in FIG. 5.

Referring to FIGS. 4A-6, an example of the ball screw spline actuator 216 is shown. As described above, the shaft 228 includes the helical groove 238 and the spline groove 242 which intersect forming the plurality of intersections 244. As best seen in FIGS. 5 and 6, forming of the helical groove 238 and spline groove 242 may be made through machining operations or techniques (described further below). In one example for forming the helical groove 238, a CNC milling machine having a cutter translates along an axis parallel to the longitudinal axis 218 of the shaft 228 and removes material from the shaft 228 while a lathe or turning device turns the shaft 228 along the longitudinal axis 218. Alternately, a CNC lathe and a stationary cutter may be used in a similar manner. Similarly, forming of the spline groove 242 may be achieved using a CNC milling machine wherein the cutter is moved along the longitudinal axis 218 of the shaft 228 to form a straight groove. In one example, one or more spline grooves 242 may be formed in the shaft 228. Other forms of machining devices and material removal operations or techniques may be used to form the helical groove 238 and the spline groove 242.

In one example of ball screw spline actuator 216 including the shaft 228, each of the helical groove 238 and the spline groove 242 may include an arcuate cross-section (e.g., curved) transverse to a groove axis 552 suitable for receipt and support of the ball bearings 443A of the ball nut 230 and the ball bearings 443B of the ball spline 236 as described above. In one example, the helical groove 238 and the spline groove 242 include an arcuate cross-section. Other configurations and cross-section shapes for the helical groove 238 and the spline groove 242 may be used.

As best seen in FIGS. 5 and 6, on forming of the helical groove 238 and the spline groove 242 having the arcuate cross-sections, at least one ridge (four shown as ridges 554 in FIG. 5) forms extending into each of the plurality of intersections 244, for example toward a center 556. In an exemplary application where the ball screw spline actuator 216 is used in, or is configured as, a suspension actuator 212 in a vehicle 100, significant and cyclical loads are applied to the ridges 554 by at least one of the ball bearings 443A of the ball nut 230 traveling along the helical groove 238 or the ball bearings 443B of the ball spline 236 traveling along the spline groove 242 as the shaft 228 linearly translates upward and downward along the longitudinal axis 218.

Over hundreds of thousands, possibly millions, of suspension actuator 212 cycles (e.g., extension and retraction in length), wherein shaft 228 linearly moves relative to the first housing part 219 along the longitudinal axis 218, and relative to the sprung component of the vehicle (e.g., the vehicle body 101), wear and damage can occur near or in the ridges 554 due to high stress concentrations formed near or in the ridges 554 due to the cyclical loads. Due to the high stress concentrations, or through fatigue of the shaft 228 material, portions of the ridges 554 can gradually wear, or fracture and separate from the ridges 554 and enter the helical groove 238 and the spline groove 242. These fractured and separated fragments of the ridges 554 can cause wear or damage to the helical groove 238, the spline groove 242, the ball bearings 443A, and the ball bearings 443B. Premature wear in the helical groove 238, the spline groove 242, the ball bearings 443A, or the ball bearings 443B can reduce the performance and/or cause premature wear, spalling, or pitting of the ball screw spline actuator 216, and thereby requiring repair or replacement of the suspension actuator 212. Reductions in performance of the suspension actuator 212 may be felt by, for example, passengers seated in the vehicle body 101.

Referring to the FIGS. 4B, 4C, 5 and 6 example of the ball screw spline actuator 216, each of the intersections 244 forms an intersection opening 558 and each of the helical groove 238 and the spline groove 242 form a groove opening 560 transverse to a groove axis 552. The helical groove 238 includes a helical race 562 (i.e., the helical groove 238 contact surface) and the spline groove 242 includes a spline race 564 (i.e., the spline groove 242 contact surface). The ball bearings 443A of the ball nut 230 engage and travel along the helical race 562 and the ball bearings 443B engage and travel along the spline race 564 on rotation of the rotor 232 (or when backdriven) as described above. In one example wherein the helical groove 238 and the spline groove 242 cross-sections are semi-circle in form, the helical race 562 and the spline race 564 are semi-circular. Other arcuate or cross-section configurations for the helical groove 238 and the spline groove 242 may be used. In each intersection 244, the intersecting helical race 562 and the spline race 564 define corners 566.

As best seen in the FIG. 6 example cross-section, each of the ridges 554 (four shown in FIG. 5) includes curved sidewalls 668 formed by the helical groove 238 and the spline groove 242 adjacently positioned to the helical groove 238. The curved sidewalls 668 converge to form an edge 670 having a first edge height 671. In the FIGS. 5 and 6 example, the shaft 228, the helical groove 238, the spline groove 242, the ridge 554, and the edge 670 are formed during a first manufacturing operation. In one example, the first manufacturing operation is commonly referred to as rough machining and may include one or more manufacturing and/or material removal devices, operations, and processes described above and/or suitable for the material of the shaft 228. Alternate first manufacturing or machining operations may be used to remove material from the shaft 228 to form the helical groove 238 and the spline groove 242, for example cutting, drilling, grinding, broaching, boring, and/or turning. Although described that the helical groove 238 may be formed in the shaft 228 prior to forming the spline groove 242, the spline groove 242 may be formed in the shaft 228 prior to forming the helical groove 238. It is also understood that although one of the grooves may be formed before the other, forming of the helical groove 238 and the spline groove 242 are considered to be formed in the first manufacturing operation as described.

In the FIGS. 5 and 6 example, a first surface finish is imparted on the helical groove 238 (or helical race 562) and the spline groove 360 (or spline race 564), the ridge 554 (and curved sidewalls 668) and the edge 670, by, or as a result of, the first manufacturing operation. In one example, the first surface finish is imparted at a first time during the first manufacturing operation. In the example best seen in FIG. 6, the edge 670 having the first surface finish is configured as pointed or relatively sharp as best seen in FIG. 6. In the example of the first manufacturing operation generating the first surface finish, the ridge 554, and more acutely the edge 670, when placed under the cyclical loads from at least one of the ball nut 230 (i.e., ball bearings 443A, shown spaced from helical race 562 for ease of illustration only) or the ball spline 236 (i.e., ball bearings 443B, shown spaced from spline race 564 for ease of illustration only), may develop high stress concentrations near or in the ridge 554 and is susceptible to wear and damage from the cyclical loads applied by the ball bearings 443A and the ball bearings 443B as described above.

Referring to the FIGS. 7 and 8 example, at least a portion of each of the ridges 554 of the ball screw spline actuator 216 initially imparted with the first surface finish is subsequently configured to have a second surface finish (illustrated in darker line in FIG. 7 than illustrated in FIG. 5) that is different than the first surface finish. In one example, the ridge 554 is subject to forming (or reforming) the edge 670 to include the second surface finish defining a surface finished edge 774. The surface finished edge 774 is configured to reduce a stress concentration in the ridge 554 caused by at least one of the ball nut 230 or the ball spline 236 as described above. In one example, the second surface finish is imparted or created at the edge 670 at a second time subsequent to the first time through a second manufacturing operation described further below. In an alternate example, the second surface finish and/or the surface finished edge 774 may be formed during the first manufacturing operation (e.g., either the ridge 554 is reformed to form the surface finished edge 774 during rough machining in the first manufacturing operation, or the first manufacturing operation includes both rough machining and precision machining steps or operations to form the second surface finish and/or the surface finished edge 774).

In an alternate example, at a second time subsequent to the first time described above, the surface finished edge 774 is formed at the edge 670 and is configured to reduce the stress concentration in the ridge 554 as described. In one example, the surface finished edge 774 is formed by a second manufacturing operation at the second time subsequent to the first manufacturing operation at the first time (i.e., the helical groove 238, the spline groove 242, the ridges 554, the curved sidewalls 668, and the edges 670 are formed at the first time by the first manufacturing operation). As described further below, the second manufacturing operation may include precision machining, grinding, deburring, sanding, polishing, lapping, and/or other precision manufacturing, material removal, or surface finishing operations or processes. In one example, the second manufacturing operation at the second time is performed sequentially subsequent to the first manufacturing operation at the first time in manufacturing of the shaft 228.

Figure 8:
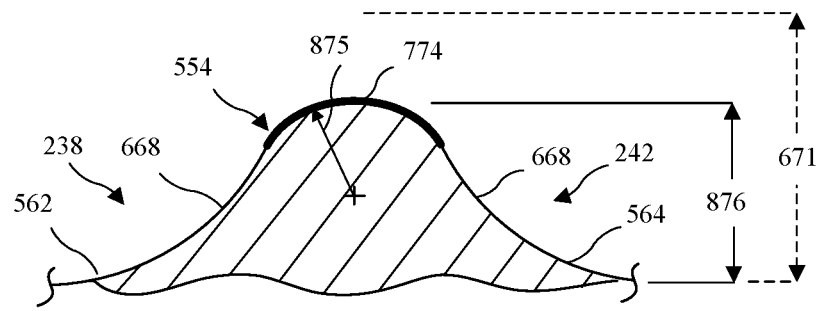
FIG. 8 is a cross-sectional view taken along line 8-8 in FIG. 7.

In the example cross-section shown in FIG. 8, the surface finished edge 774 includes a radius 875 formed between the curved sidewalls 668. In one example, a portion of the edge 670 is removed (or reformed) by the second manufacturing operation to form the radius 875 having a second edge height 876 (FIG. 8) which is less than the first edge height 671 (FIG. 6, and shown in dashed line in FIG. 8). In one example, the radius 875 is formed at the second time subsequent to the first time. In one example, the second manufacturing operation forming the radius 875 may include any one of, or a combination of, the second manufacturing operations or techniques described above. In one example, polishing (e.g., removal of a small amount of the shaft 228 material just at the edge 670 using a fine abrasive) may be used to form the radius 875. In another example, machining or sanding (e.g., using a cutting tool or a coarse abrasive tool or media) at the edge 670 may be used to form the radius 875. Thus, the radius 875 may be formed by removal of at least a portion of the edge 670 in a second manufacturing operation subsequent to the first manufacturing operation to form the radius 875.

In an alternate example of the surface finished edge 774, removal (or reforming) of a portion of the edge 670 may include or result in a flat or planar portion (not shown), or other geometric shape or configuration, to remove or reform the edge 670 from a pointed or relatively sharp configuration (FIG. 6) to a different configuration or form to reduce the stress concentration on the ridge 554 as described above. Although described as removal or reforming the edge 670 to form the surface finished edge 774, the second surface finish and/or the surface finished edge 774 are not limited specifically to the edge 670 of the ridge 554, but may also include the curved sidewalls 668 as well (not shown). In another example, the corners 566 may also be partially removed or reformed to include the second surface finish or be subjected to the second manufacturing operation. In other words, for example, the second surface finish, for example through the second manufacturing operation, can be used on other portions of the ridge 554 including the curved sidewalls 668, and the portions of the helical race 562, the spline race 564, and/or the corners 566 positioned in the intersection 244.

In another example, the surface finished edge 774 may be a tumbled edge. In one example, following forming of the helical groove 238 and the spline groove 242 (and therefore the intersections 244), the shaft 228 and the intersections 244 may be subject to the second manufacturing operation in the exemplary form of vibratory tumbling using a vibratory tumbler. In one example, the vibratory tumbling is conducted at a second time subsequent to the first time. In one example, the vibratory tumbler includes deburring media which contacts the ridges 554 to generate the second surface finish and/or form or reform the edge 670 to the surface finished edge 774 (e.g., FIG. 8) to reduce the stress concentration in the ridge 554 when the shaft 228 is subject to the cyclical loads from at least one of the ball nut 230 or the ball spline 236 as described above. Thus, the tumbled edge is formed through vibratory tumbling of the shaft 228 with a deburring media in the second manufacturing operation.

Figure 7:
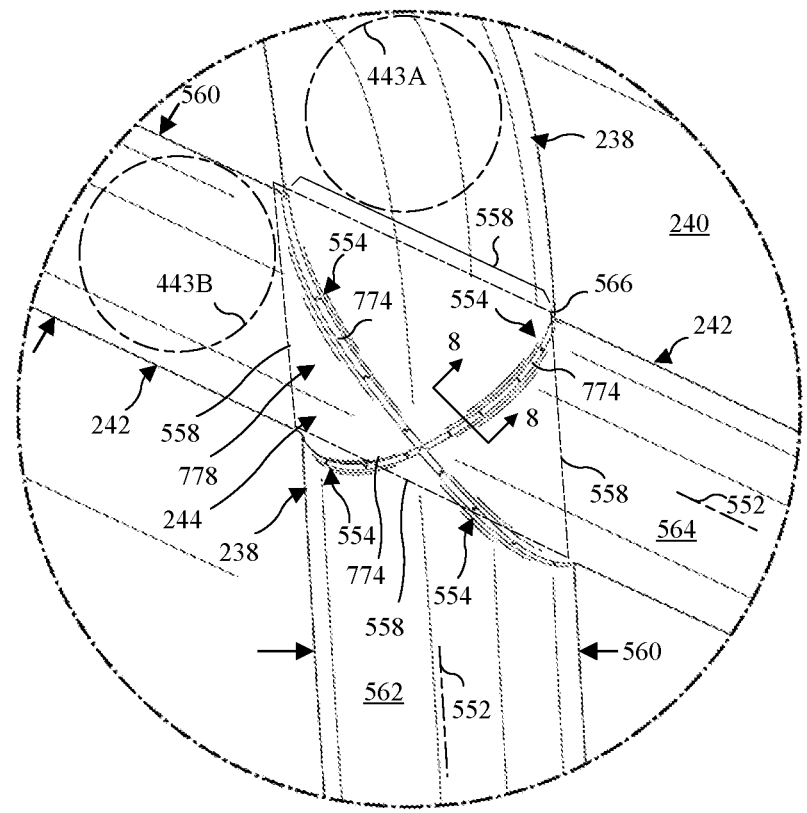
FIG. 7 is an enlarged view of the intersection area A in FIG. 4A including a second surface finish or following a second manufacturing operation.

Referring to the FIG. 7 example, in one example of the surface finished edge 774 in the form of the tumbled edge, the vibratory tumbler media is sized such that the tumbler media is small enough to enter the intersection 244 (i.e., the space or area defined by or in-between the four intersection openings 558) to contact and form or reform the portion of the ridges 554 to achieve the tumbled edge (i.e., the surface finished edge 774), but the tumbler media is too large to enter the groove opening 560 of the helical groove 238 and the spline groove 242 in areas of the grooves positioned outside of the intersection 244. In this example, only the ridges 554, or more locally only the edges 670, are placed in contact with the tumbler media resulting in only the ridges 554, or the edges 670, including the second surface finish or reforming by the second manufacturing operation resulting in the surface finished edge 774.

In another example, the tumbler media may be sized to also contact the helical groove 238 (e.g., the helical race 562) and the spline groove (e.g., the spline race 564) portions positioned in the intersections 244 to achieve the second surface finish or reforming due to the second manufacturing operation on these surfaces as well. In another example, the tumbler media may be sized to also contact the corners 566 to achieve the second surface finish or reforming through the second manufacturing operation resulting in the surface finished edge 774 on the corners 566. Generating the second surface finish and/or reforming through the second manufacturing operation of these additional surfaces or structures in the intersection 244 may form a surface finished intersection 778 which reduces stress concentrations near or in the ridges 554 as described above.

In alternate examples, other second manufacturing operations generally described above can be used on the entirety of the shaft 228 (including the entirety of the helical groove 238 and spline groove 242), or more locally in the intersections 244, or even more locally on the ridges 554 or the edges 670, to achieve the second surface finish and/or the surface finished edge 774. In one example, the second manufacturing operations are performed at the second time subsequent to the first time as described above. In one example, the entirety of the shaft 228 may be subject to an alternate second manufacturing operation, for example and alternate machining, deburring, sanding, and/or polishing process as described above. In another example, the ridges 554 or the edges 670 may be subject to an alternate second manufacturing operation through automated devices (for example the vibratory tumbler) or manual processes to achieve the second surface finish and/or the surface finished edge 774. In one example, an automated CNC milling process may be used to reform the ridges 554 or the edges 670. In another example, the intersections 244, the ridges 554, and/or the edges 670 may be subject to an alternate deburring or surface finishing process, for example localized bead blasting or sand blasting. In another example, the ridges 554 or the edges 670 may be hand sanded or polished to form or reform the edges 670 to achieve the second surface finish and/or the surface finished edge 774. Other processes, techniques, or second manufacturing operations may be used to form the second surface finish and/or the surface finished edge 774 to reduce the stress concentrations near or in the ridges 554 as described above.

In another example of the ball screw spline actuator 216, the ridges 554 are substantially or completely removed using one or more of the second manufacturing operations described. In the example, the second manufacturing operation is employed to substantially remove, or completely remove, the ridges 554. In one example, the second manufacturing operation is a CNC milling operation using a cutter to remove shaft 228 material to remove the ridges 554. Other of the second manufacturing operations described above may be used. In one example, removal of the ridges 554 configures the helical groove 238 (i.e., the helical race 562) and the spline groove 242 (i.e., the spline race 564) to be continuous and uninterrupted through the intersections 244. Removal of the ridges 554 serves to eliminate any stress concentrations formed in the ridges or in the intersections 244 caused by the cyclical loads as described above.

Figure 9:
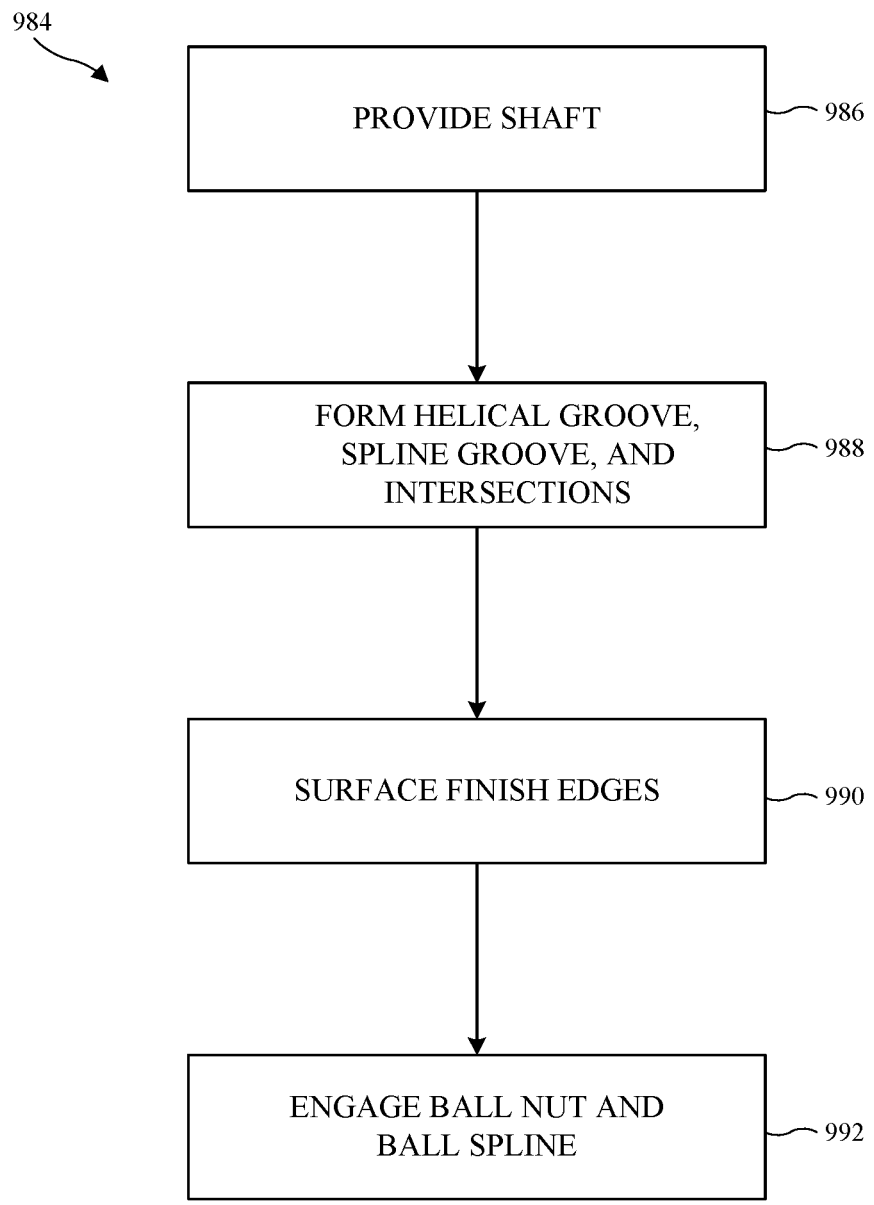
FIG. 9 is a schematic block diagram of an example of a method for manufacturing a ball screw spline actuator.

Referring to FIG. 9, an example of a method 984 for manufacturing a ball screw spline actuator 216 is shown. As described above, one example of the ball screw spline actuator 216 includes the shaft 228, ball nut 230, and the ball spline 236 (FIG. 4A). In the FIG. 9 example, in step 986 the shaft 228 is provided. As described above, in one example the shaft 228 is a round, hollow shaft.

In step 988, the helical groove 238 and the spline groove 242 are formed in the shaft 228 as described above. In the step 988, the helical groove 238 and the spline groove 242 are formed in the first manufacturing operation. In one example, the helical groove 238 and the spline groove 242 are each configured to have an arcuate cross-section. In one example the helical groove 238 and the spline groove 242 are formed at a first time. The first manufacturing operation may include one or more of the manufacturing operations or processes described above. As described above, the spline groove 242 is configured to intersect the helical groove 238 at a plurality of intersections 244. In one example, the formation of the helical groove 238 and the spline groove 242 form at least one of the ridges 554 each having an edge 670 in each intersection 244. In the examples illustrated, each intersection 244 includes four ridges 554. In one example described above, the helical groove 238, the spline groove 242, the ridges 554, and the edges 670 include a first surface finish generated by the first manufacturing operation.

In example step 990, the edges 670 of the ridges 554 are formed or reformed to include or achieve a surface finished edge 774 configured to reduce a stress concentration on the ridges 554. In one example described above, the edge 670 is formed or reformed to the surface finished edge 774 through a second manufacturing operation subsequent to the first manufacturing operation. In another example, the edge 670 is formed or reformed to include the surface finished edge 774 at a second time subsequent to the first time. The second manufacturing operation may include one or more of the second manufacturing operations or processes described above.

As described above, the second manufacturing operation may be used on the shaft 228 in areas other than locally on the edge 670 of the ridge 554. For example, the second manufacturing operation may be used, and the second surface finish formed, on the curved sidewalls 668 of the ridge 554, as well as the helical groove 238 (i.e., the helical race 562), the spline groove 242 (i.e., the spline race 564), and/or corners 566 in the areas of the intersections 244. Where the second manufacturing operation is used on the surfaces of the intersection 244 (i.e., the ridges 554, the helical race 562 and the spline race 564, a surface finished intersection 778 is formed).

In example step 992, the ball nut 230 and ball spline 236 are engaged with the shaft 228. As described above, the ball bearings 443A of the ball nut 230 are engaged with the helical groove 238 and the ball bearings 443B of the ball spline 236 are engaged with the spline groove 242 forming the ball screw spline actuator 216 (FIG. 4A). As described above and illustrated in FIG. 4A, a thrust bearing 446, or other bearing, may be engaged with the ball nut 230. In one example of the ball screw spline actuator 216 configured as a suspension actuator 212, the ball screw spline actuator 216 is then mounted to the housing, for example the first housing part 219 and the second housing part 220 (FIGS. 2, 3), to form the suspension actuator 212 described and illustrated above.

In the method 984 for manufacturing the ball screw spline actuator 216, the first manufacturing operation and the second manufacturing operation are completed on the shaft 228 prior to final material processing or finishing of the shaft 228. In one example, the second manufacturing operation occurs during a final material machining operation, for example finish machining or grinding of the shaft 228 prior to material or surface hardening operations or process on the shaft 228. In one example step (not shown), the shaft 228 is subject to one or more final finishing or manufacturing operations to complete the shaft 228.

In an alternate example, the shaft 228, the helical groove 238, the spline groove 242, the ridges 554, and the edges 670 may be formed during the first manufacturing operation (i.e., rough machining as described above). The shaft 228 is then induction hardened, stresses relieved or reduced, and straightened. The outer surface of the shaft 228, the ridges 554, and/or the edges 670 are then subject to the second manufacturing operation as described above. In one example described, the edges 670 are reformed to form the surface finished edge 774 in the second manufacturing operation as described.

In one example step (not illustrated), subsequent to the second manufacturing operation, the shaft 228 is subject to a final finishing operation. In one example of the final finishing operation, the shaft 228 may undergo a heat treatment process to surface harden at least portions of the shaft 228, for example surface harden the helical race 562 and the spline race 564 to reduce wear due to the cyclical loads applied by the ball bearings 443A of the ball nut 230 and the ball bearings 443B of the ball spline 236. In alternate or additive final finishing operations, the helical race 562 and the spline race 564 may undergo a polishing operation to remove minor imperfections or further smooth the race surfaces to reduce wear and increase the life of the ball screw spline actuator 216. Other final finishing or manufacturing operations may be used on shaft 228 subsequent to the second manufacturing operation. It is understood that alternate, or additional, steps for the method 984 may be used, and the steps may occur in a different order than as described and illustrated. It is also understood that one or more described steps may be removed from the method 984.

As used in the claims, phrases in the form of "at least one of A, B, or C" should be interpreted to encompass only A, or only B, or only C, or any combination of A, B and C.

As described above, one aspect of the present technology is an active suspension system or active suspension actuator, which may be incorporated in or used in conjunction with a device that includes the gathering and use of data available from various sources. As an example, such data may identify a user and/or include user-specific settings or preferences for the vehicle suspension. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores user preferences so that user settings can be applied automatically. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, information needed to configure a device according to user preferences may be obtained each time the system is used and without subsequently storing the information or associating the information with the particular user.

What is claimed is:

1. A ball screw spline actuator, comprising:
   a shaft having a longitudinal axis, the shaft defining a helical groove extending along the shaft and a spline groove extending along the shaft, each of the helical groove and the spline groove having a first surface finish, the spline groove intersecting the helical groove at a plurality of intersections each defining a ridge having a second surface finish different than the first surface finish;
   a ball nut engaged with the helical groove configured to apply a first torque to the shaft about the longitudinal axis; and
   a ball spline engaged with the spline groove configured to apply a second torque to the shaft about the longitudinal axis to counteract the first torque to the shaft preventing a rotation of the shaft about the longitudinal axis and allowing the shaft to linearly translate along the longitudinal axis relative to the ball nut and the ball spline,
   wherein the helical groove or the spline groove comprise an arcuate cross-section,
   wherein the ridge further comprises:
      curved sidewalls formed by the helical groove and the spline groove adjacently positioned to the helical groove, and
      an edge formed by a convergence of the curved sidewalls,
   wherein the edge is reformed to include the second surface finish defining a surface finished edge configured to reduce a stress concentration in the ridge as a result of a cyclical load applied by the ball nut or the ball spline, and
   wherein the surface finished edge comprises a radius formed between the curved sidewalls.

2. The ball screw spline actuator of claim 1 wherein the arcuate cross-section comprises a semi-circular arc.

3. The ball screw spline actuator of claim 1 wherein the edge and the first surface finish are formed by a first manufacturing operation and the radius is formed by removal of at least a portion of the edge in a second manufacturing operation subsequent to the first manufacturing operation to form the radius.

4. The ball screw spline actuator of claim 1 wherein the surface finished edge comprises a tumbled edge.

5. The ball screw spline actuator of claim 4 wherein the tumbled edge is formed through vibratory tumbling of the shaft with a deburring media.

6. The ball screw spline actuator of claim 1, wherein the ball screw spline actuator is configured as a suspension actuator having a housing connected to a vehicle body of a vehicle, the ball nut is rotatably connected to the housing and the ball spline is connected to the housing, the suspension actuator is configured to form a load path between the vehicle body of the vehicle and an unsprung mass component of the vehicle, wherein the shaft is configured to linearly translate along the longitudinal axis relative to the vehicle body allowing a relative movement between the vehicle body and the unsprung mass component of the vehicle.

7. The ball screw spline actuator of claim 6, wherein the suspension actuator further comprises:
    a ball screw actuator including a motor connected to the housing configured to rotate the ball nut about the longitudinal axis to linearly translate the shaft along the longitudinal axis.

8. The ball screw spline actuator of claim 7, wherein the motor further comprises:
    a stator connected to the housing; and
    a rotor configured to rotate about the longitudinal axis relative to the stator, the rotor is connected to the ball nut to rotate in unison about the longitudinal axis; and
    wherein the ball screw actuator further comprises:
    a thrust bearing connected to the housing and engaged with the ball nut, the thrust bearing configured to allow the ball nut to rotate about the longitudinal axis and remain axially stationary along the longitudinal axis relative to the housing.

9. The ball screw spline actuator of claim 1, wherein the surface finished edge is formed by abrasive blasting.

10. The ball screw spline actuator of claim 1, wherein the surface finished edge is formed by polishing.

11. The ball screw spline actuator of claim 1, wherein the surface finished edge is formed by sanding.

12. A ball screw spline actuator, comprising:
    a shaft having a longitudinal axis, the shaft defining a helical groove and a spline groove each having an arcuate cross-section and extending along the shaft, the spline groove intersecting the helical groove at a plurality of intersections forming four ridges each having a surface finished edge extending into each intersection configured to reduce a stress concentration in the ridges when placed under a cyclical load;
    a ball nut engaged with the helical groove configured to apply a first torque to the shaft about the longitudinal axis; and
    a ball spline engaged with the spline groove configured to apply a second torque to the shaft about the longitudinal axis configured to linearly translate the shaft along the longitudinal axis relative to the ball nut and the ball spline and preventing rotation of the shaft about the longitudinal axis,
    wherein each of the surface finished edges comprises curved sidewalls formed at a first time by the helical groove and the spline groove adjacently positioned to the helical groove, the curved sidewalls converging to define an edge, the surface finished edge formed at the edge at a second time subsequent to the first time, and
    wherein the surface finished edge comprises a radius between the curved sidewalls.

13. The ball screw spline actuator of claim 12 wherein the radius is formed by a polishing operation at the second time.

14. The ball screw spline actuator of claim 12 wherein the surface finished edge comprises a tumbled edge.

15. The ball screw spline actuator of claim 14 wherein the tumbled edge is formed through vibratory tumbling of the shaft with a deburring media at the second time.

16. The ball screw spline actuator of claim 12, wherein the ball screw spline actuator is configured as a suspension actuator having a housing connected to a vehicle body of a vehicle, the ball nut is rotatably connected to the housing and the ball spline is connected to the housing, the suspension actuator is configured to form a load path between the vehicle body and an unsprung mass component of the vehicle, wherein the shaft is configured to linearly translate along the longitudinal axis relative to the vehicle body allowing a relative movement between the vehicle body and the unsprung mass component of the vehicle.

17. The ball screw spline actuator of claim 16, wherein the suspension actuator further comprises a ball screw actuator comprising:
    a motor comprising:
        a stator connected to the housing; and
        a rotor configured to rotate about the longitudinal axis relative to the stator, the rotor is connected to the ball nut to rotate in unison about the longitudinal axis; and
    a thrust bearing connected to the housing and engaged with the ball nut, the thrust bearing configured to allow the ball nut to rotate about the longitudinal axis and remain axially stationary along the longitudinal axis relative to the housing.

18. The ball screw spline actuator of claim 12, wherein the surface finished edge is formed by abrasive blasting.

19. The ball screw spline actuator of claim 12, wherein the surface finished edge is formed by polishing.

20. The ball screw spline actuator of claim 12, wherein the surface finished edge is formed by sanding.

* * * * *